Dec. 8, 1959   W. T. CAMPE   2,916,592
SEAL
Filed June 2, 1958

INVENTOR.
WILLIAM T. CAMPE
BY
ATTORNEY

2,916,592

SEAL

William T. Campe, Crystal Lake, Ill., assignor to Minneapolis-Honeywell Regulator Company, Minneapolis, Minn., a corporation of Delaware Application June 2, 1958, Serial No. 739,202

7 Claims. (Cl. 200—168)

The present invention is directed to a seal for an oscillating lever disposed in a housing or bushing, wherein means are provided to control the action of the seal upon oscillation of the lever.

Specifically, the present invention is directed to a seal for a toggle switch wherein the seal is operatively fastened to the toggle switch actuating handle and wherein the seal includes a flange portion arranged to engage the interior wall surface of the switch housing or bushing in which the actuating handle is supported.

Where a seal is disposed on an oscillating lever, which lever is arranged to be disposed in a housing and wherein the seal is free to move with respect to the interior wall surface of the housing and wherein the actual sealing portion of the seal is in the form of a flange portion, it is necessary for the flange to have an optimum flexibility so that a proper wiping of the flange with respect to the interior wall of the housing is realized. If the flange has too great a lateral dimension, binding of the flange results upon oscillation of the lever, whereas if the lateral dimension of the flange is not sufficient, a buckling of the flange results upon oscillation of the lever.

A seal arrangement is disclosed herein which provides a flange portion of optimum flexibility so that an adequate wiping between the flange and the interior wall surface of the bushing is realized and wherein no buckling of the flange is encountered. To provide the optimum flexibility in the flange or sealing portion of the seal, a sleeve or boot portion integral with the flange is provided which is operatively fastened to the oscillating lever. The utilization of the boot or sleeve tends to give "body" to the flange thereby inhibiting buckling of the flange. Further, to insure an adequate wiping action and sealing between the flange and the interior wall surface of the housing, both while at rest and upon oscillation of the handle, a slight taper is provided on the flange. Thus, the dimension of the lateral portion of the outer extremity of the flange is less than that of the lateral interior segments of the flange. Also, the taper tends to eliminate any possible binding between the flange and the interior wall surface of the housing.

Generally speaking, seals for oscillating levers utilizing a flange movable upon oscillation of the lever for cooperation with the interior wall surface of a housing are old in the art. However, most of these sealing arrangements have drawbacks as to the forming of the seal and holding the tolerances thereof and/or the manner of disposing the seal on the oscillating lever. The seal of the present invention is characterized by the fact that it is formed by a simple molding process and the holding of tolerances raises no problem, and because of the structure of the seal and the lever upon which it is disposed, assembly poses no problem.

It is therefore an object of the present invention to provide a seal for an oscillating lever, which seal includes a flange movable with the lever for cooperation with the interior wall surface of a housing with which the lever is associated and wherein the flange provided exhibits optimum flexibility and wherein an improved seating of the flange of the seal with the interior wall surface of the housing is realized.

It is another object of this invention to provide a seal of the type set forth above wherein the flexibility of the flange of the seal is controlled by a sleeve or boot portion disposed about the operating lever and formed integral with the flange portion.

Another object of the invention is to provide a seal as set forth above wherein the seating between the flange of the seal and the interior wall surface of the housing is improved by providing a taper on the flange.

Still another object of this invention is to provide a seal member which is simple to fabricate by means of conventional methods and which is capable of being disposed on the operating lever with ease.

These and other objects will become more apparent from a reading of the following specification and the appended claims in which:

Figure 1:
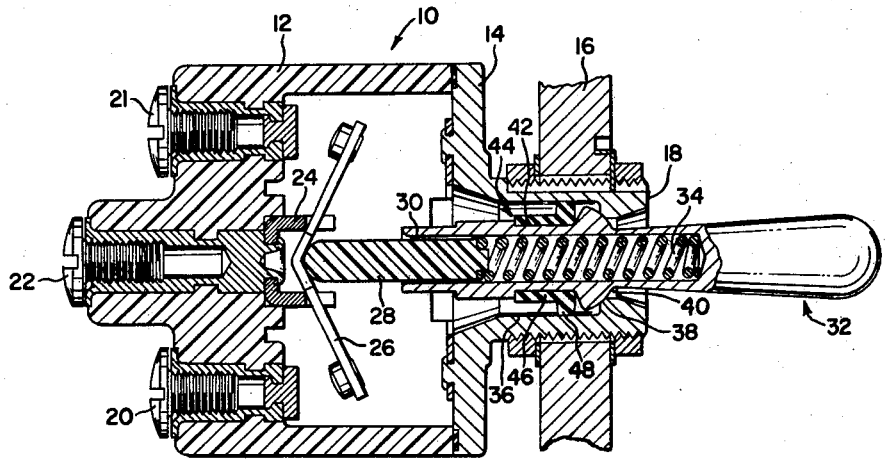
Figure 1 is a view of a toggle switch shown in the center of neutral position incorporating a seal which is the subject matter of the present invention.
Figure 2:
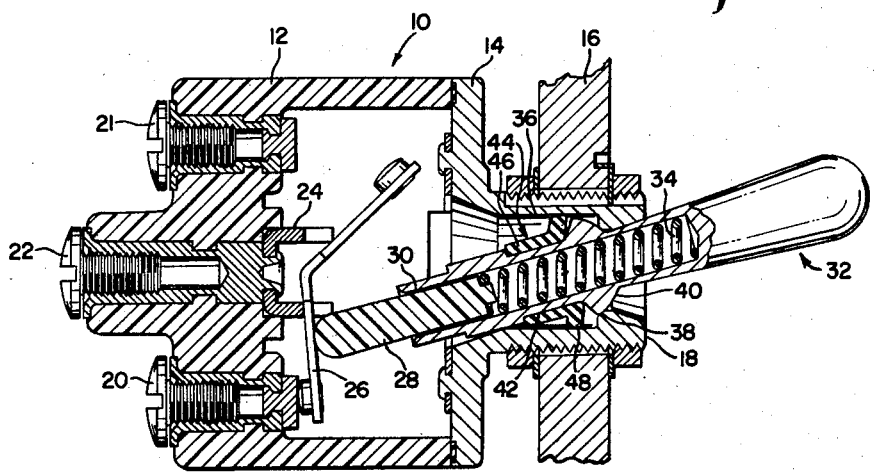
Figure 2 is a view showing the toggle switch and the seal with the toggle switch in an actuated condition.

As shown in Figures 1 and 2, a toggle switch 10, comprised of a casing 12 and a cover 14, is appropriately mounted to a panel 16 by means of bushing 18 associated with the cover 14. Supported within the casing 12 are terminal members 20 and 21 located on either side of terminal and pivot support member 22. Pivot 24 is operatively fastened to the inner extremity of terminal 22 and has associated therewith contact carrier 26. Maintaining the contact carrier 26 in place is a pin 28 disposed in opening 30 of a toggle switch actuating handle 32 and biased outwardly therefrom by a spring 34. Bushing 18 includes a cylindrical opening or bore 36 terminating in a shoulder 38 against which a spherical portion 40 of the actuating handle 32 abuts. Also located on the actuating handle 32, inwardly of the spherical portion 40, is a circumferential groove or undercut 42.

Figures 3, 4:
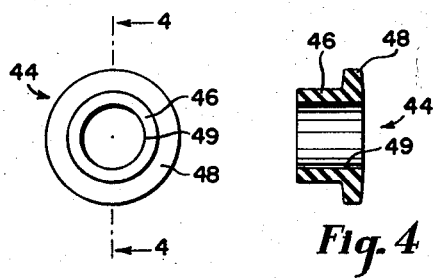
Figure 3 is an end view of the seal shown in Figures 1 and 2.
Figure 4 is a cross sectional view of the seal of Figure 3 taken along the lines 4—4 thereof.

A molded seal 44, formed of an elastic material and located on the actuating handle 32, is best shown in Figures 3 and 4. The seal 44 is comprised of a circular sleeve or boot portion 46 and a circular flange portion 48 integral therewith. The flange 48 includes a slight taper on opposite surfaces thereof so that the lateral dimension of segments of the outer periphery of the flange 48 is less than the lateral dimension of segments of the interior portion of the flange. The cylindrical bore 49 of the seal 44 is of a smaller dimension than the inner extremity of the actuating handle 32, so that the seal 44 must be expanded and stressed when being assembled therewith. Likewise, when in place, the sleeve 46 is placed in compression with respect to and elastically surrounds the undercut 42 of the actuating handle 32 so as to be operatively fastened thereto. It will be noted that no undue expansion is required to dispose the seal 44 in the undercut 42, and hence assembly of the seal 44 to the actuating handle 32 poses no problems. Further, the seal being formed by molding, rather than by blanking, etc., tolerance problems are minimized.

Again, referring to Figures 1 and 2, the outer periphery of the flange 48 is of a greater dimension than the periphery of the opening 36. Thus, with the actuating handle 32 and seal 44 in place in the bushing 18, the flange 48 is placed in compression with respect to the opening 36 of the bushing 18 and remains so regardless whether the seal is in the position shown in Figure 1 or Figure 2.

The undercut 42 is located on the actuating handle 32 so that with the seal 44 disposed therein, the centroid of the flange 48 substantially coincides with the center of curvature of the spherical portion 40. Upon oscillation of the actuating handle 32, the flange 48 moves but a minimum distance about the centroid of the flange and the center of the curvature of the spherical portion 40 and the outer periphery of the flange is subject to minimum further compression with respect to the opening 36 of the bushing 18.

From the above, it will be appreciated that with the toggle switch 10 in the position shown in Figure 1 or in the position shown in Figure 2, or the position opposite to that shown in Figure 2, or any position therebetween, the sleeve 46 and the flange 48 of the seal 44 are both in compression with respect to the actuating handle 32 and the interior wall surface of the bushing 18, respectively, so that sealing areas are set up therebetween. Oscillation of the actuating handle 32 to the position shown in Figure 2 results in movement of the contact carrier 26 and engagement of one of the contacts associated therewith with one of the contacts associated with the terminal members 20 and 21. Further, movement of the actuating handle 32 about the centroid of the flange and the center of curvature of the spherical portion 40 to the position shown in Figure 2 results in the flange 48 of the seal 44 moving with respect to the wall surface of the opening 36 of the bushing 18 and wiping thereagainst.

With a seal merely including a flange portion of the type set forth herein, where the inner periphery thereof is in compression with the actuating handle and the outer periphery is in compression with the interior wall surface of the bushing wherein the actuating handle and the seal are disposed, there is a tendency for the flange to buckle, both when at rest and when moving from one position to another. By providing a sleeve portion integral with the flange portion, as taught herein, the buckling normally expected is no longer apparent and an optimum flexibility of the flange portion is realized. The seal comprised of a sleeve portion and a flange portion thus provides an improved seal between the seal member and the actuating handle and the interior wall surface of the bushing.

Further, it is important that the seal area between the flange portion and the interior wall surface of the bushing be effective both while at rest and while the actuating handle and the seal member are moving from one position to another. To help provide a proper seal between the flange portion and the interior wall surface of the bushing, the taper on the flange portion is provided. The taper limits binding of the outer periphery of the flange with respect to the interior wall surface of the bushing. While the whole flange could be reduced in lateral dimension to accomplish this, the problem of buckling mentioned above, would once more appear due to the reduced flexure strength of the flange. Thus, it can be seen that providing the flange with a taper results in a better seal between the outer periphery of the flange and the interior wall surface of the bushing and does so without increasing the buckling tendency of the flange portion.

While the seal has been shown disposed in an undercut on the actuating handle and has been described as being in compression therewith, it is obvious that the undercut could be dispensed with and the seal could be fastened to the actuating handle by cementing, mechanical fasteners, or other fastening methods. Similarly, while the seal has been shown to include both a flange portion and a sleeve portion, it may be desirable in certain applications to merely utilize a tapered flange portion and to dispense with the sleeve portion. Other modifications of the invention are possible, and therefore, the scope of this invention should be determined from the following claims, in which.

I claim:

1. A sealing arrangement for a toggle switch comprising: a switch housing including a bushing having a cylindrical interior wall portion and a shoulder portion; a switch actuating handle including a spherical portion, said handle being partially disposed in said casing and bushing and arranged with the spherical portion biased against said shoulder portion; and a seal formed of elastic material including a sleeve portion disposed in a complementary undercut portion located on said handle so as to be placed in compression and including a tapered circular flange integral with said sleeve portion, the outer periphery thereof engaging the interior wall portion of said bushing so as to be placed in compression, said seal being located in said undercut portion so that the centroid of said flange portion substantially coincides with the center of curvature of said spherical portion; oscillation of said handle resulting in a pivotal movement thereof about said centroid and said center of curvature and further resulting in a wiping action by the outer periphery of the flange portion of said seal on the interior wall portion of said bushing.

2. A sealing arrangement for a toggle switch comprising: a switch housing including a bushing having a cylindrical interior wall portion and a shoulder portion; a switch actuating handle including a spherical portion, said handle being partially disposed in said casing and bushing and arranged with the spherical portion biased against said shoulder portion; and a seal formed of elastic material disposed in an undercut located on said handle so as to be placed in compression and including a tapered circular flange portion, the outer periphery thereof engaging the interior wall portion of said bushing so as to be placed in compression, said seal being located in said undercut portion so that the centroid of said flange portion substantially coincides with the center of curvature of said spherical portion; oscillation of said handle resulting in a pivotal movement thereof about said centroid and said center of curvature and further resulting in a wiping action by the outer periphery of the flange portion of said seal on the interior wall portion of said bushing.

3. A sealing arrangement for a toggle switch comprising: a switch housing including a bushing having a shoulder portion; a switch actuating handle including a spherical portion, said handle being partially disposed in said casing and bushing and arranged with the spherical portion biased against said shoulder portion; and a seal formed of elastic material including a boot portion disposed in a complementary undercut portion located on said handle so as to be placed in compression and including a flange portion integral with said boot portion, the outer periphery thereof engaging the interior wall portion of said bushing so as to be placed in compression, said seal being located in said undercut portion so that the centroid of said flange portion substantially coincides with the center of curvature of said spherical portion; oscillation of said handle resulting in a pivotal movement thereof about said centroid and said center of curvature and further resulting in a wiping action by the outer periphery of the flange portion of said seal on the interior wall portion of said bushing.

4. A sealing arrangement for a toggle switch comprising: a switch housing including a bushing having a shoulder portion; a switch actuating handle including a spherical portion, said handle being partially disposed in said casing and bushing and arranged with the spherical portion biased against said shoulder portion; and a seal formed of elastic material operatively fastened to said handle and including a flange portion, the outer periphery thereof engaging the interior wall portion of said bushing so as to be placed in compression, said seal being located on said handle so that the centroid of said flange portion substantially coincides with the center of curvature of said spherical portion; oscillation of said handle resulting in a pivotal movement thereof about said centroid and said center of curvature and further resulting in a wiping action by the outer periphery of the flange portion of said seal on the interior wall portion of said bushing.

5. A sealing arrangement for a toggle switch comprising: a switch housing including a bushing having a shoulder portion; a switch actuating handle including a spherical portion, said handle being partially disposed in said casing and bushing and arranged with the spherical portion biased against said shoulder portion; and a seal formed of elastic material including a boot portion operatively fastened to said handle and including a flange portion integral with said boot portion, the outer periphery thereof engaging the interior wall portion of said bushing so as to be placed in compression, said seal being located on said handle so that the centroid of said flange portion substantially coincides with the center of curvature of said spherical portion; oscillation of said handle resulting in a pivotal movement thereof about said centroid and said center of curvature and further resulting in a wiping action by the outer periphery of the flange portion of said seal on the interior wall portion of said bushing.

6. A sealing arrangement for an oscillating lever comprising: a bushing; a lever partially disposed and operatively supported in said bushing; and a seal formed of resilient material including a boot portion operatively fastened to said lever and including a flange portion integral with said boot portion, the outer periphery thereof engaging the interior wall portion of said bushing so as to be placed in compression; oscillation of said lever resulting in a wiping action by the outer periphery of the flange portion of said seal on the interior wall portion of said bushing.

7. A sealing arrangement for an oscillating lever comprising: a bushing; a lever partially disposed and operatively supported in said bushing; and a seal formed of resilient material operatively fastened to said lever and including a tapered flange portion, the outer periphery thereof engaging the interior wall portion of said bushing so as to be placed in compression; oscillation of said lever resulting in a wiping action by the outer periphery of the flange portion of said seal on the interior wall portion of said bushing.

References Cited in the file of this patent

UNITED STATES PATENTS

| | | |
|---|---|---|
| 2,400,849 | Stearns | May 21, 1946 |
| 2,650,964 | Razdow | Sept. 1, 1953 |
| 2,726,105 | Koenig | Dec. 6, 1955 |
| 2,759,075 | Hults | Aug. 14, 1956 |
| 2,795,667 | Schwerke | June 11, 1957 |
| 2,795,959 | Roeser | June 18, 1957 |

FOREIGN PATENTS

| | | |
|---|---|---|
| 9,744 | Great Britain | Apr. 28, 1904 |